United States Patent
Rausch et al.

(10) Patent No.: US 9,418,688 B1
(45) Date of Patent: Aug. 16, 2016

(54) SYSTEM AND METHOD FOR DETECTING SHIFTING OF READER-WRITER OFFSET IN A HEAT-ASSISTED MAGNETIC RECORDING HEAD

(71) Applicant: Seagate Technology LLC, Cupertino, CA (US)

(72) Inventors: Tim Rausch, Farmington, MN (US); Tong Shirh Stone, Eden Prairie, MN (US); Mark Allen Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/812,032

(22) Filed: Jul. 29, 2015

(51) Int. Cl.
*G11B 11/00* (2006.01)
*G11B 5/48* (2006.01)
*G11B 5/00* (2006.01)
*G11B 5/60* (2006.01)
*G11B 5/31* (2006.01)

(52) U.S. Cl.
CPC .............. *G11B 5/4886* (2013.01); *G11B 5/314* (2013.01); *G11B 5/6005* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,421,197 B1 | 7/2002 | Abdelnour | |
| 6,510,017 B1 | 1/2003 | Abdelnour | |
| 6,671,790 B2 | 12/2003 | Gay Sam et al. | |
| 6,754,030 B2 | 6/2004 | Seng et al. | |
| 6,873,488 B2 | 3/2005 | Teo et al. | |
| 7,173,781 B2 | 2/2007 | Lim et al. | |
| 7,440,221 B2 | 10/2008 | Tsuchinaga et al. | |
| 7,602,575 B1 | 10/2009 | Lifchits et al. | |
| 7,982,994 B1 | 7/2011 | Erden et al. | |
| 8,154,811 B2 | 4/2012 | Barsotti et al. | |
| 8,264,918 B2 | 9/2012 | Hashimoto et al. | |
| 8,416,646 B2 | 4/2013 | Huang et al. | |
| 8,913,335 B2 | 12/2014 | Coker et al. | |
| 8,941,944 B1* | 1/2015 | Dai | G11B 5/012 360/31 |
| 9,093,091 B1* | 7/2015 | Chu | G11B 5/314 |
| 2007/0230026 A1* | 10/2007 | Takaishi | G11B 5/59627 360/77.08 |
| 2007/0247742 A1* | 10/2007 | Saikawa | G11B 5/59633 360/75 |
| 2008/0030890 A1* | 2/2008 | Ohzeki | G11B 5/59644 360/77.14 |
| 2008/0239906 A1* | 10/2008 | Akagi | G11B 5/59633 369/53.17 |
| 2014/0192435 A1* | 7/2014 | Buch | G11B 5/553 360/48 |

* cited by examiner

*Primary Examiner* — Tan X Dinh (74) *Attorney, Agent, or Firm* — Hollingsworth Davis, LLC (57) ABSTRACT

A heat-assisted magnetic recording head is configured to write data to and read data from a magnetic recording medium. The head comprises a reader and a writer including a near-field transducer (NFT). The reader comprises a center which is laterally offset relative to a center of the writer to define a reader-writer offset (RWO) therebetween. A controller is configured to control the writer to write data to data tracks of the medium, detect a shift in the RWO, and in response to the detected shift in the RWO, control the writer to write data to a plurality of tracks defining a reserved band during an open period of the reserved band.

22 Claims, 11 Drawing Sheets

SYSTEM AND METHOD FOR DETECTING SHIFTING OF READER-WRITER OFFSET IN A HEAT-ASSISTED MAGNETIC RECORDING HEAD

Embodiments of the disclosure are directed to an apparatus comprising a heat-assisted magnetic recording head configured to write data to and read data from a magnetic recording medium. The head comprises a reader and a writer including a near-field transducer (NFT). The reader comprises a center which is laterally offset relative to a center of the writer to define a reader-writer offset (RWO) therebetween. A controller is configured to control the writer to write data to data tracks of the medium, detect a shift in the RWO, and in response to the detected shift in the RWO, control the writer to write data to a plurality of tracks defining a reserved band during an open period of the reserved band.

Some embodiments are directed to an apparatus comprising a heat-assisted magnetic recording head configured to write data to and read data from a magnetic recording medium. The head comprises a reader and a writer including a near-field transducer (NFT). The reader comprises a center which is laterally offset relative to a center of the writer to define a reader-writer offset (RWO) therebetween. A controller is configured to control the writer to write data to data tracks of the medium, detect a first shift in the RWO, and in response to the first RWO shift, control the writer to write data to a plurality of tracks defining a first reserved band during a first open period of the first reserved band. The controller is also configured to detect a second shift in the RWO, and in response to the second RWO shift and expiration of the first open period, control the writer to write data to a plurality of tracks defining a second reserved band during a second open period of the second reserved band.

Other embodiments are directed to a method comprising moving a heat-assisted magnetic recording head relative to a magnetic recording medium comprising a plurality of tracks. The head comprises a reader and a writer including a near-field transducer (NFT). The reader comprises a center which is laterally offset relative to a center of the writer to define a reader-writer offset (RWO) therebetween. The method also comprises writing data to data tracks of the medium, detecting a shift in the RWO, and writing data to a plurality of tracks defining a reserved band during an open period in response to detecting the RWO shift, such that the data written to tracks of the reserved band during the open period have substantially the same RWO.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to managing changes in an offset between a writer and a reader (referred to herein as reader-writer offset or RWO) of a HAMR head. Embodiments are directed to maintaining reliable read/write performance in the presence of a changing RWO. Embodiments are directed to writing data to standard tracks of a magnetic storage medium, detecting a change in RWO, and, in response, writing data to reserved tracks using a write architecture differing from that used when writing to standard data tracks. According to various embodiments, data is written to the reserved tracks during a period of time in which RWO is relatively constant or stable, thereby eliminating or mitigating the problem of a changing RWO encroaching on neighboring tracks that were written with a different RWO.

Figure 1:
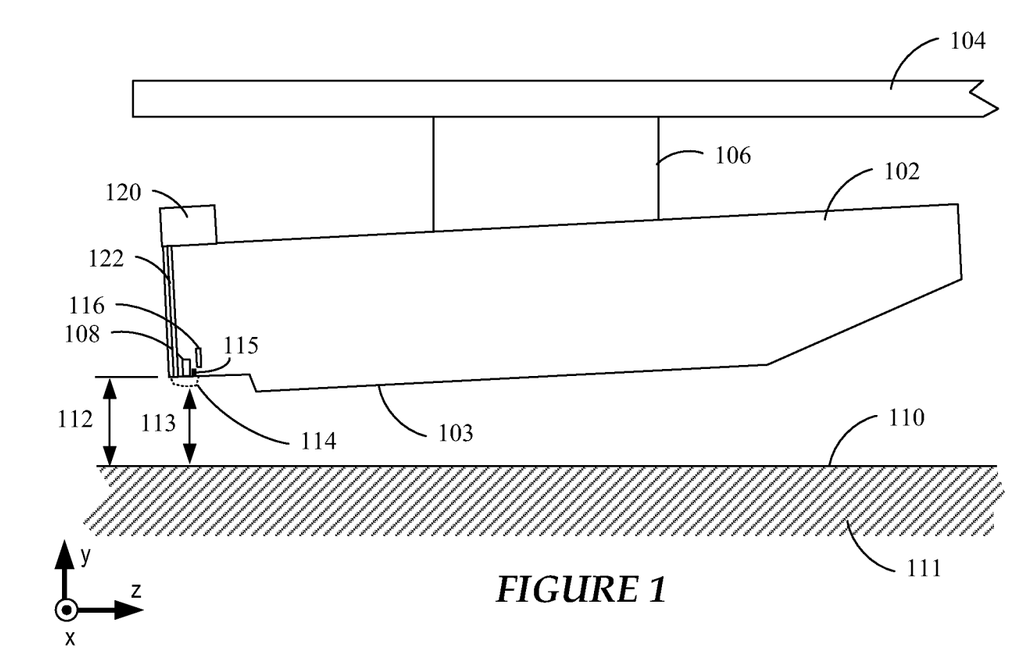
FIG. 1 is a schematic representation of a slider in which the various embodiments disclosed herein may be implemented.

Referring now to FIG. 1, a block diagram shows a side view of a read/write transducer 102 according to a representative embodiment. The read/write transducer 102 may be used in a magnetic data storage device, e.g., a hard disk drive. The read/write transducer 102 may also be referred to herein as a slider, read head, recording head, etc. The read/write transducer 102 is coupled to an arm 104 by way of a suspension 106 that allows some relative motion between the read/write transducer 102 and arm 104. The read/write transducer 102 includes read/write transducers 108 at a trailing edge that are held proximate to a surface 110 of a magnetic recording medium 111, e.g., magnetic disk. The read/write transducer 102 shown in FIG. 1 is configured as a HAMR recording head, which includes a laser 120 and a waveguide 122. The waveguide 122 delivers light from the laser 120 to components (e.g., a near-field transducer) near the read/write transducers 108.

When the read/write transducer 102 is located over surface 110 of recording medium 111, a flying height 112 is maintained between the read/write transducer 102 and the surface 110 by a downward force of arm 104. This downward force is counterbalanced by an air cushion that exists between the surface 110 and an air bearing surface 103 (also referred to herein as a "media-facing surface") of the read/write transducer 102 when the recording medium 111 is rotating. It is desirable to maintain a predetermined slider flying height 112 over a range of disk rotational speeds during both reading and writing operations to ensure consistent performance. Region 114 is a "close point" of the read/write transducer 102, which is generally understood to be the closest spacing between the read/write transducers 108 and the magnetic recording medium 111, and generally defines the head-to-medium spacing 113. To account for both static and dynamic variations that may affect slider flying height 112, the read/write transducer 102 may be configured such that a region 114 of the read/write transducer 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116. A thermal sensor 115 is shown situated at or near the close point 114 (e.g., adjacent the read/write transducers 108, such as near the near-field transducer) or can be positioned at other location of the ABS 103.

Figure 2:
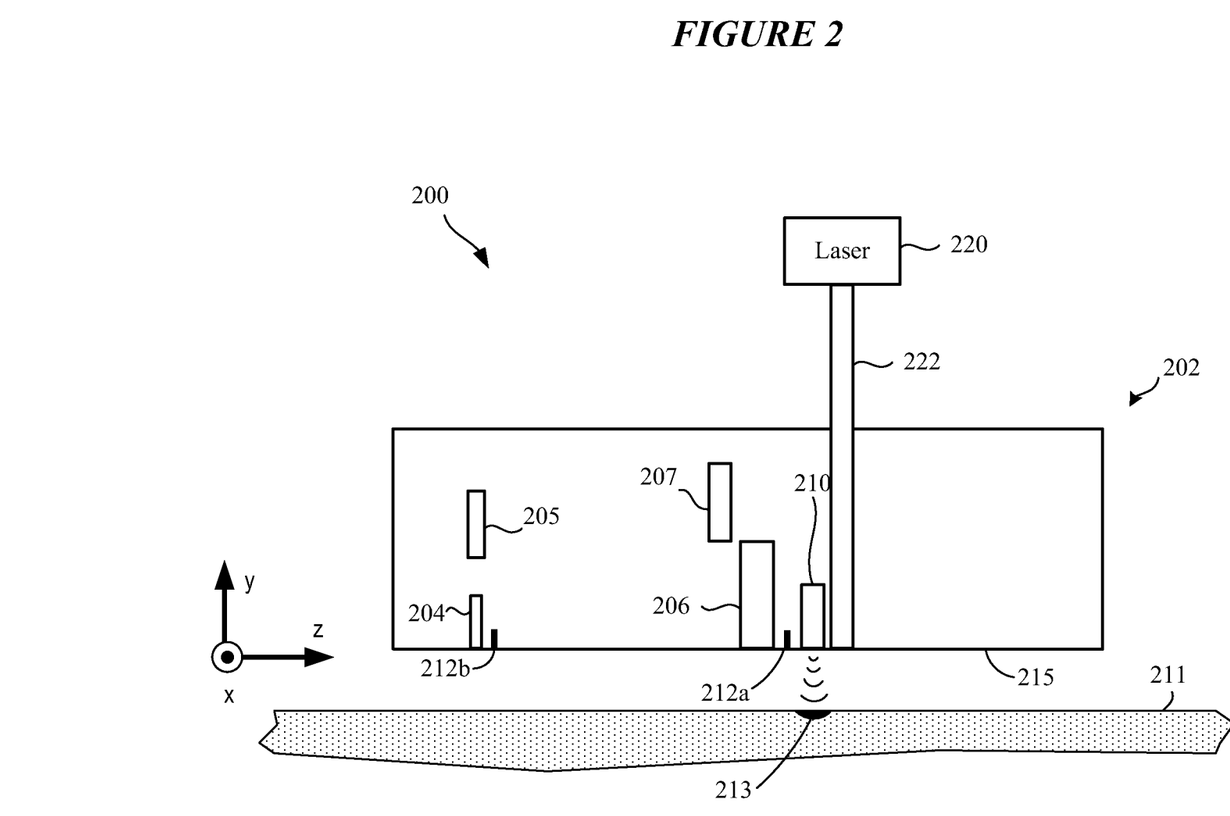
FIG. 2 shows a heat-assisted magnetic recording (HAMR) head arrangement in accordance with various embodiments.

FIG. 2 shows a HAMR head arrangement 200 in accordance with various embodiments. The recording head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent a near-field transducer (NFT) 210 which is optically coupled to a light source 220 (e.g., laser diode) via a waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211. One or more thermal sensors 212a, 212b can be situated at various locations on the slider 202 at or near the ABS 215 for purposes of monitoring temperature, head-medium spacing changes, and head-medium contact.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 213 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 213 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hot spot on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hot spot 213. At resonance, a high electric field surrounds the NFT 210 due to the collective oscillations of electrons at the metal surface (e.g., substrate) of the magnetic medium 211. At least a portion of the electric field surrounding the NFT 210 tunnels into, and gets absorbed by, the magnetic medium 211, thereby raising the temperature of the spot 213 on the medium 211 as data is being recorded.

The writing process implemented by a HAMR device generates high temperatures at the NFT 210 and writer 206, as well as the hot spot 213 on the magnetic medium 211. The elevated temperatures associated with HAMR device operation have been found to undesirably alter the operation of the NFT 210, such as by slightly changing the shape of the NFT 210 or gradient of energy emitted by the NFT 210. Such slight changes of the NFT 210 result in a change in the location of the hot spot 213 on the medium 211 and, therefore, the location of the data written to the medium 211. As a consequence of this change in hot spot location on the medium 211, the data is no longer written to the centerline of a data track, for example, but to a location offset laterally of the track centerline. Changes in the down track position are also possible which manifest themselves as a lateral offset only when writing at skew. This, in turn, results in errors when the reader 204 attempts to read the data and also leads to erasure of adjacent track data when the offset thermal spot 213 encroaches on the neighboring tracks.

Figure 3:
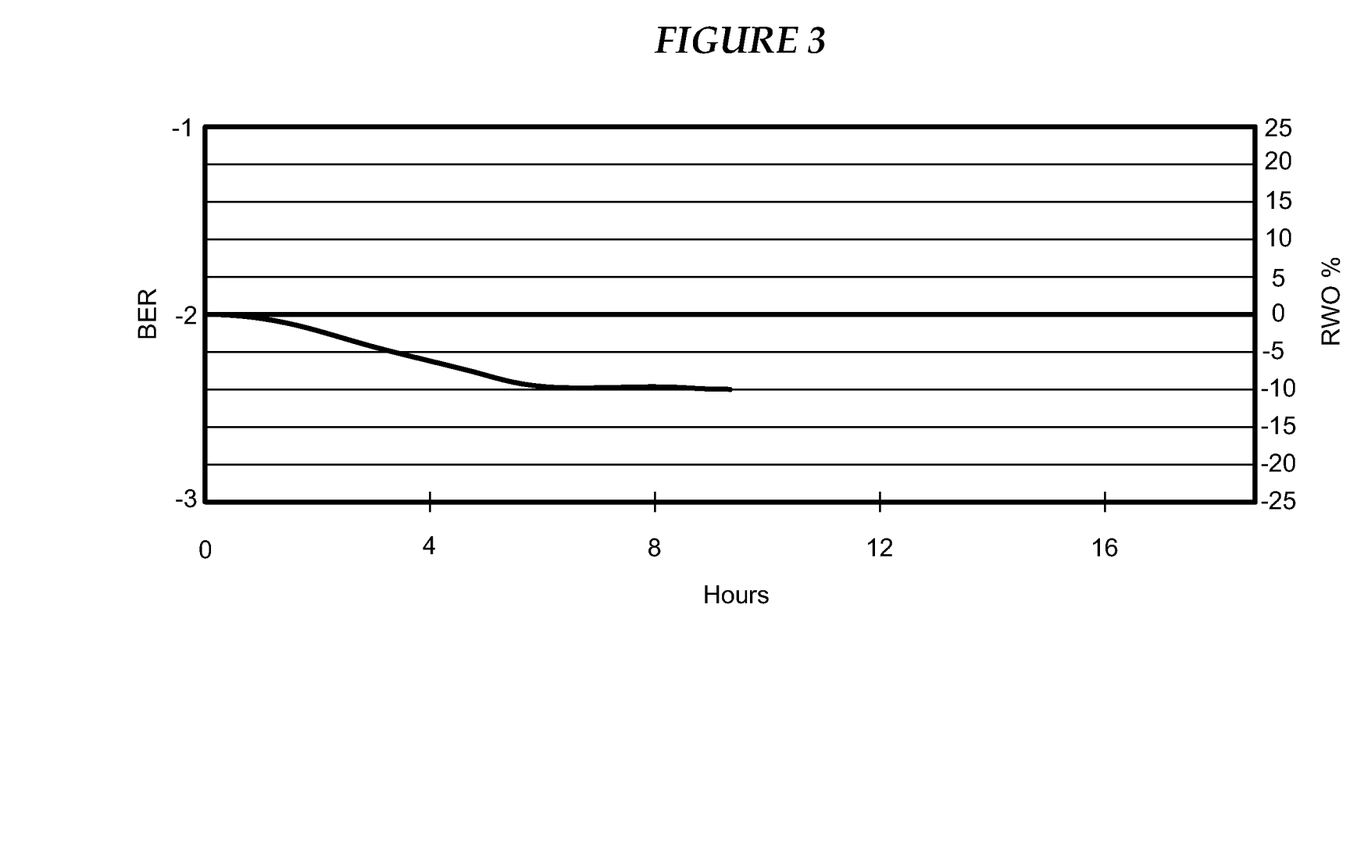
FIG. 3 shows an example of how RWO offset for a HAMR head changes with time in accordance with various embodiments.

In current HAMR systems, the reader-writer offset is not constant with time. FIG. 3 shows an example of how the RWO offset for a HAMR head changes with time during recording with a zero degree skew angle. In the graph shown in FIG. 3, the left y-axis is bit error rate (BER), the right y-axis is percent change of RWO, and the x-axis is hours. In this illustrative example, over a course of about 6 hours of writing (i.e., the writer and laser/NFT constantly energized), the RWO shifted by approximately 10% of the track pitch. The change in the RWO in a HAMR head is due primarily to changes in the NFT. In an NFT configuration having an elongated peg connected to an enlarged portion, for example, it has been found that degradation of the peg over time causes changes in the focal point of energy emitted by the peg over time. The RWO in a HAMR head can change somewhat unpredictably, changing relatively slowly for periods of time, and remaining relatively stable for other periods of time.

As the RWO offset changes over time, the shift can negatively impact the performance of the drive in two ways. First, when the RWO changes, the head is no longer writing a data track at the track center. This means that when the reader reads back the signal, it is not reading from the track center impairing performance. Second, if there is an RWO that changes with time, data tracks written with a shifting RWO will be encroaching on neighboring tracks. For example, suppose data is written on track n and on track n+1 with a stable RWO. Since both tracks have the same RWO, normal reading and writing operations can occur. After a period of time, assume the RWO changes by 10% towards track n+1. If data is then written on track n, the head will be encroaching on track n+1 and could erase the data written on track n+1

Figure 4A:
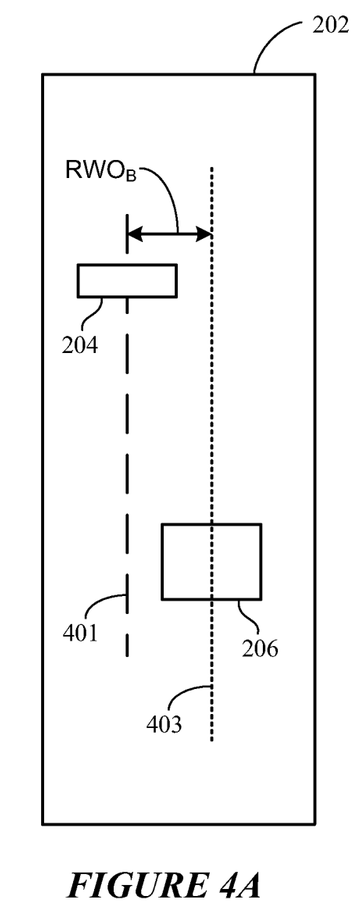
FIG. 4A is an illustration of a HAMR slider which includes a writer spaced apart from a reader by a baseline RWO in accordance with various embodiments.
Figure 4B:
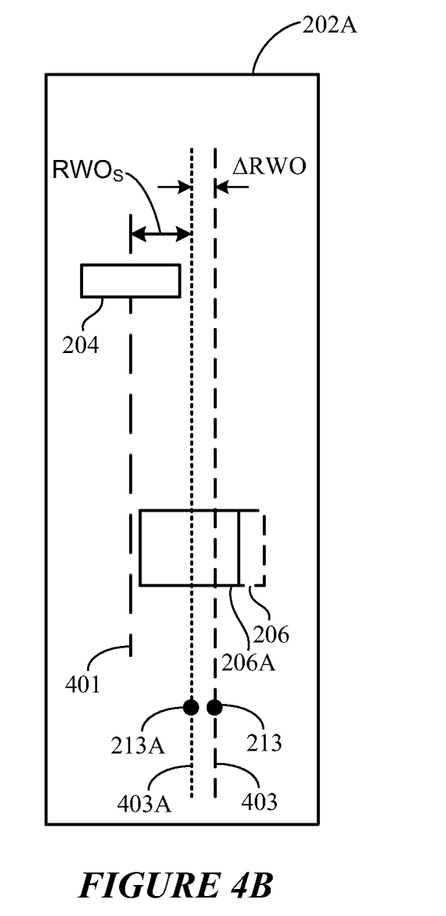
FIG. 4B is an illustration of a HAMR slider which includes a writer spaced apart from a reader by a shifted RWO in accordance with various embodiments.

FIG. 4A is an illustration of a slider 202 which includes a writer 206 spaced apart from a reader 204 by a baseline RWO ($RWO_B$). The baseline $RWO_B$ represents a designed amount of lateral offset between the writer 206 and the reader 204. In FIG. 4A, the center of the reader 204 is shown tracking the centerline 401 of a track of the magnetic recording medium. FIG. 4B illustrates a slider 202A which includes a shifted $RWO_S$ (relative to the baseline $RWO_B$ shown in FIG. 4A) defined between the writer 206 and the reader 204. As was previously discussed, shifting of the RWO can occur in a HAMR head due to elevated temperatures affecting the writer 206 (e.g., structural changes of the adjacent NFT and shifting of the focus of energy emitted by the NFT).

In the illustration of the slider 202A shown in FIG. 4B, the center of the reader 204 is shown tracking the centerline 401 of a data track. FIG. 4B shows a centerline 403 of the writer 206 assuming a baseline $RWO_B$ exists between the writer 206 and reader 204, as is the case in FIG. 4A. FIG. 4B also shows a lateral shift of the centerline 403 of the writer 206 to a shifted centerline 403A due to the shift in reader-writer offset from $RWO_B$ to $RWO_S$. The magnitude of this shift in reader-writer offset is shown as ΔRWO in FIG. 4B. As a result of the RWO shift, the hot spot 213A created by the writer 206A is shifted from its baseline location 213 by a distance ΔRWO, which would have been the hot spot location had the RWO shift not occurred. As a result of the RWO shift from $RWO_B$ to $RWO_S$, the shifted hot spot 213A is no longer located at the designed reader-writer offset ($RWO_B$) when the reader tracks the centerline of the data track, leading to read errors, some of which may be recoverable and some of which may not.

It has been found that the change in RWO for a HAMR head varies relatively slowly with writing time (e.g., see FIG. 3 data). Embodiments of the disclosure are directed to techniques for writing data to one or more bands of reserved tracks on a magnetic recording medium during a time in which RWO is changing. Data can be written to a particular band of reserved tracks only during a period of time in which the RWO is expected to remain substantially stable or constant (e.g., the shift in RWO is no greater than about 10 percent of track pitch) for the particular band. In response to a shift of RWO for a particular band exceeding a predetermined threshold, the particular band can be closed to further data writing and a new band of reserved tracks can be opened for subsequent writing (only during a period of time in which the RWO of the new band is substantially stable or constant). Closing a reserved band at the appropriate time ensures that all the tracks of the closed band will have substantially the same RWO, which allows for reliable reading of the data recorded in the reserved band.

Writing to reserved tracks during a limited duration of time eliminates or mitigates the problem of a changing RWO encroaching on neighboring tracks that were written with a different RWO. After closure of a particular band of reserved track, data written to the particular band is preferably moved to standard data tracks of the medium. Since changes in the RWO are time dependent and time limited, once the RWO is determined to sufficiently stable/constant (e.g., over a period of hours), normal writing operations can be resumed whereby standard data tracks are written to on the medium.

Figure 5:
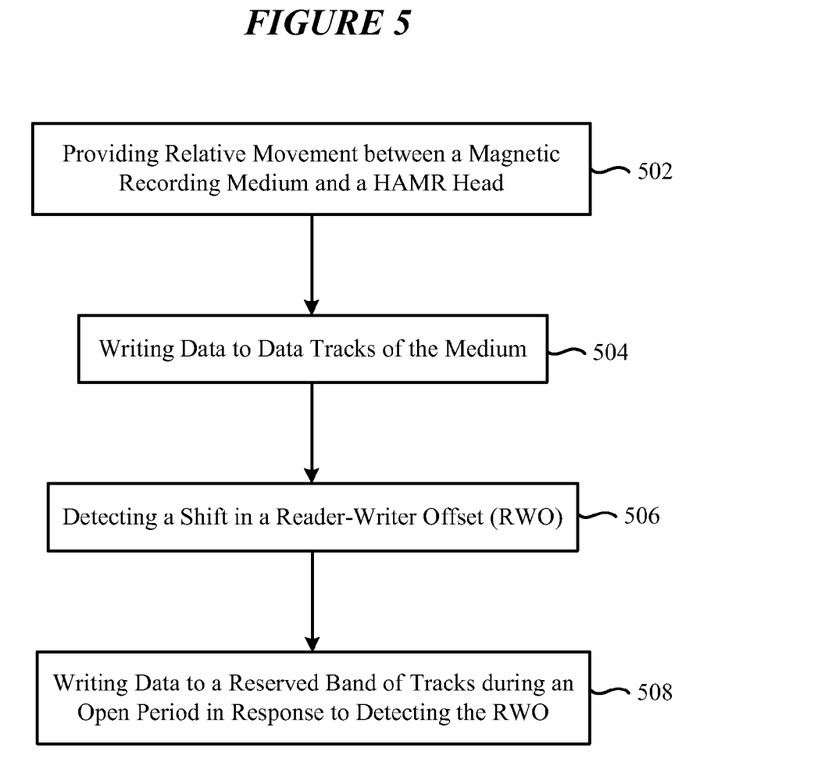
FIG. 5 illustrates various processes involving the writing of data during a period of time in which RWO is changing in accordance with various embodiments.

FIG. 5 illustrates various processes involving the writing of data during a period of time in which RWO is changing in accordance with various embodiments. The embodiment illustrated in FIG. 5 involves providing 502 relative movement between a magnetic recording medium and a HAMR head. The methodology shown in FIG. 5 also involves writing 504 data to data tracks of the media (e.g., a standard writing mode of operation) and detecting 506 a shift in the reader-writer offset. A shift in RWO can be detected in a number of ways, including an increase in bit error rate, monitoring the variable gain amplifier's gain settings, a degradation in off-track read capability (OTC), and use of a sectors recoverable metric, for example. In response to detecting the RWO shift, data is written 508 to a band of reserved tracks during an open period. For example, data can be written to a band of reserved tracks in a sequential manner, such as in LBA (logical block address) order. In some embodiments, data can be written to a band of reserved tracks using a shingled magnetic recording methodology. In other embodiments, data can be written to the band of reserved tracks using an interlaced magnetic recording methodology.

The open period defines a period of time during which the RWO shift remains substantially constant or remains within a predetermined range (e.g., percentage range, distance range). The duration of the open period is typically dependent on write time and write temperature of the writer. For example, the open period can be shorter for a HAMR head that has relatively high data writing demands. For a HAMR head that has relatively low writing demands, the open period can be longer.

Figure 6:
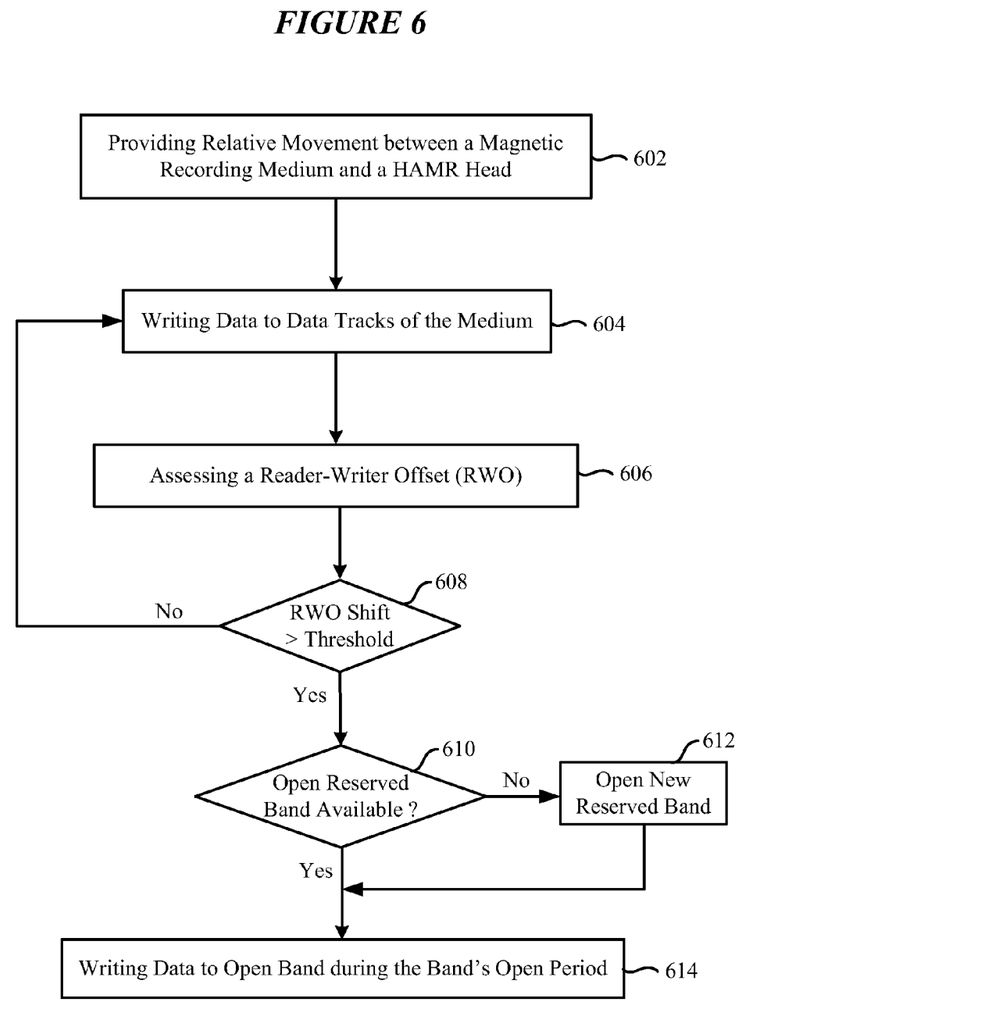
FIG. 6 illustrates various processes involving the writing of data during a period of time in which RWO is changing in accordance with various embodiments.

FIG. 6 illustrates various processes involving the writing of data during a period of time in which RWO is changing in accordance with various embodiments. The embodiment illustrated in FIG. 6 involves providing 602 relative movement between a magnetic recording medium and a HAMR head, writing 604 data to data tracks of the media (e.g., a standard writing mode of operation), and assessing 606 a reader-writer offset. The RWO is measured and compared to a threshold. If the shift in RWO exceeds the threshold, as tested in step 608, a check is made 610 to determine if a band of reserved data tracks (also referred to herein as a reserved band) is available. If a reserved band is available, data is written 614 to the open band during the band's open period. If an open band is not available, a new reserved band is opened 612 and data is written to the new reserved band during the new reserved band's open period.

Figure 7:
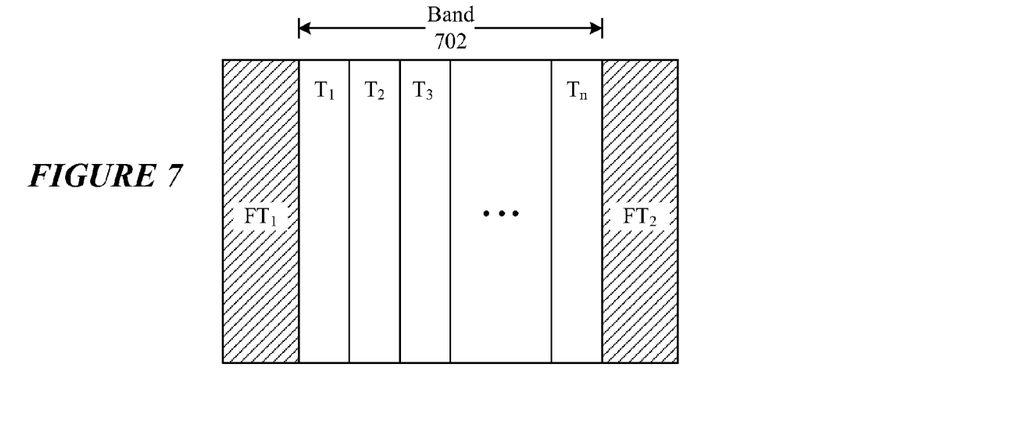
FIGS. 7-9 illustrate different configurations of a band of reserved tracks in accordance with various embodiments.
Figure 8:
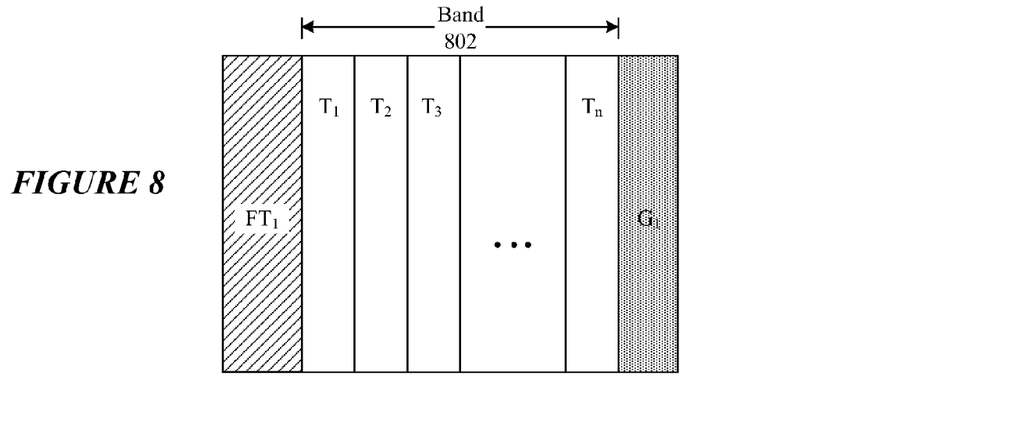
Figure 9:
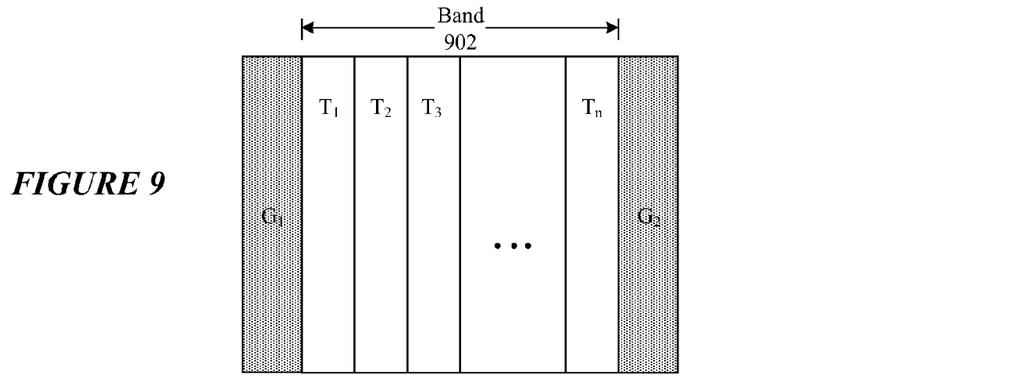

FIGS. 7-9 illustrate different configurations of a band of reserved tracks in accordance with various embodiments. In FIG. 7, a band 702 of reserved tracks, $T_1$-$T_n$, are shown bounded by a first fat track, $FT_1$ and a second fat track, $FT_2$. A fat track refers to a track that is significantly larger than a standard data track, and is not intended to store data but rather to serve as a buffer between data tracks. The number of tracks, $T_n$, of the reserved band 702 can vary depending on a number of factors (e.g., volume of data to be stored, type of data to be stored, data storage architecture, capacity of the medium). In some embodiments, the number of tracks, $T_n$, of the reserved band 702 can be between about 50 tracks and 500 tracks. For example, the reserved band 702 can include about 100 tracks. FIG. 8 shows an embodiment of a band 802 of reserved tracks in which a number of data tracks, $T_1$-$T_n$, are bounded by a fat track, $FT_1$, and a guard track or guard band, $G_1$. FIG. 9 shows an embodiment of a band 902 of reserved tracks in which a number of data tracks, $T_1$-$T_n$, are bounded by first and second guard tracks or bands, $G_1$ and $G_2$.

Figure 10:
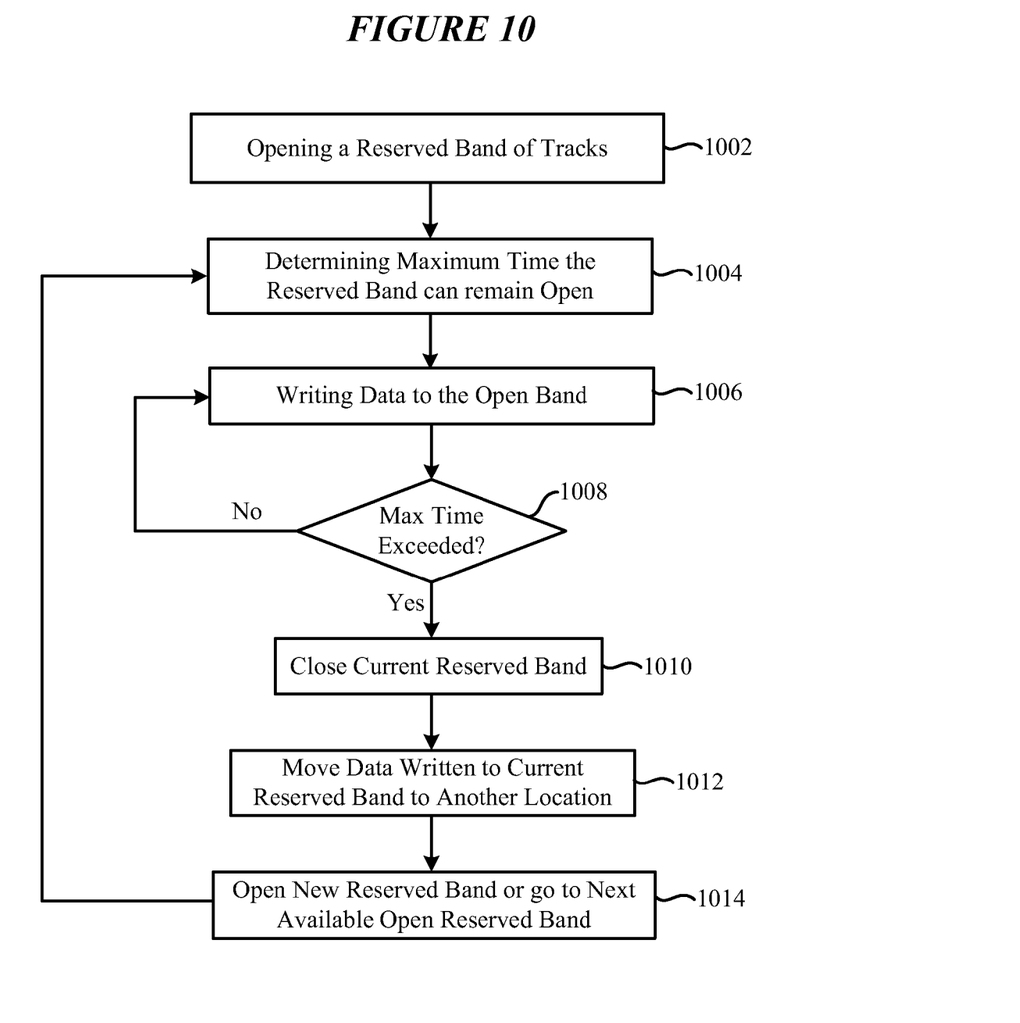
FIG. 10 illustrates various processes involving a reserved band of tracks in accordance with various embodiments.

FIG. 10 illustrates various processes involving a reserved band of tracks in accordance with various embodiments. The embodiment illustrated in FIG. 10 involves opening 1002 a reserved band of tracks, such as in response to detection of an RWO shift in excess of a predetermined threshold. The methodology shown in FIG. 10 involves determining 1004 the maximum time the reserved band can remain open. The maximum open time is reflective of the estimated time in which the RWO for the open band is expected to remain substantially stable or constant. One approach to determining the maximum open time for the reserved band involves determining the expected duration of write time and write temperature of the writer.

As is further shown in FIG. 10, data is written 1006 to the open band and a check is made to determine 1008 if the maximum open time has been exceeded. If not exceeded, data can continue to be written to the open band 1006. If the maximum open time has been exceeded 1008, the current reserved band is closed 1010 for further writing of data. Following closure of the reserved band, data stored in the reserved band can be moved 1012 to another location on the medium. The methodology shown in FIG. 10 further involves opening 1014 a new reserved band or accessing another available (pre-existing) reserved band in response to closure of the current reserved band. For the new or next available open reserved band, processing continues at step 1004.

Figure 11:
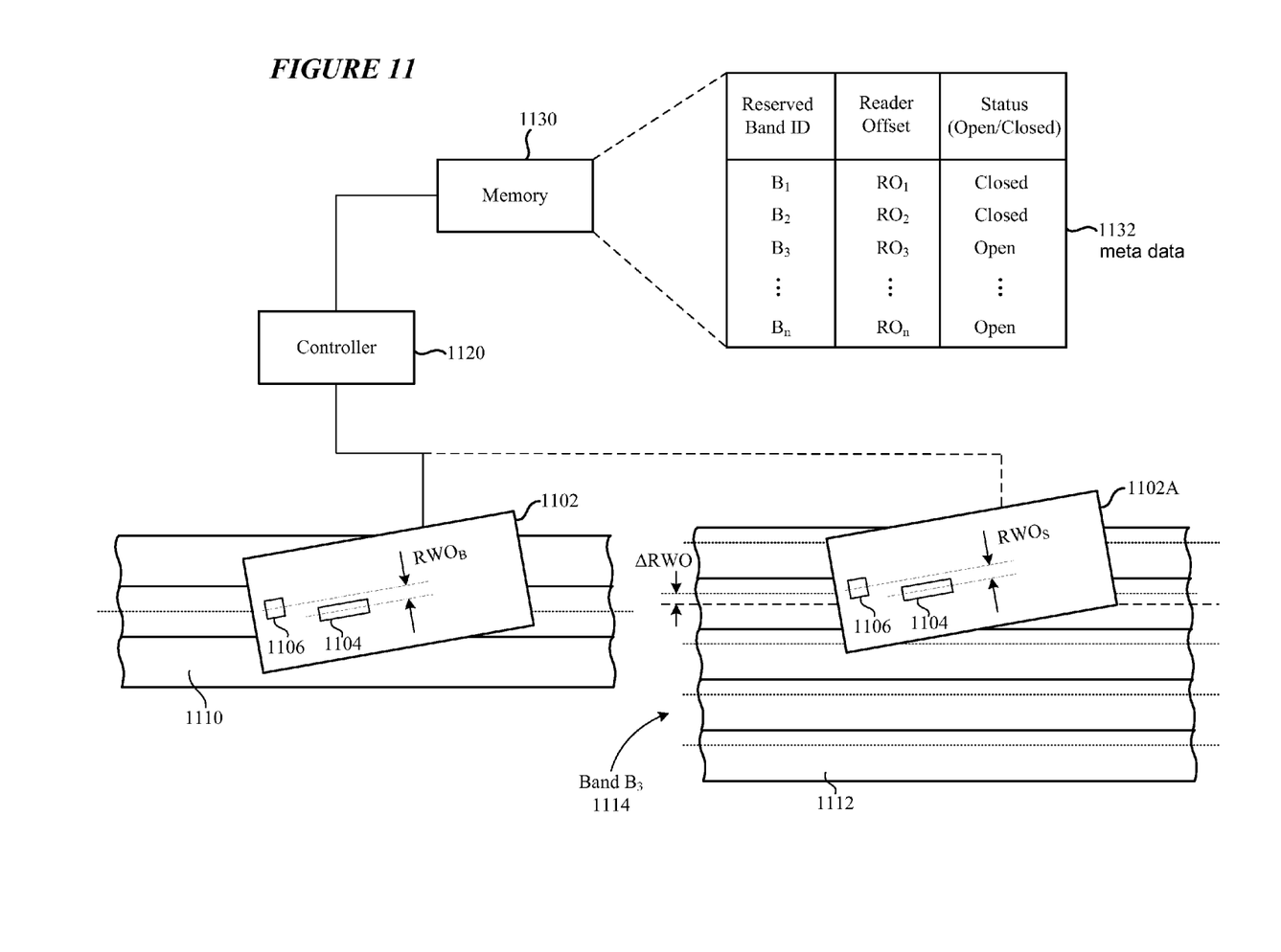
FIG. 11 is a block diagram of a system for managing bands of reserved tracks in accordance with various embodiments.

FIG. 11 is a block diagram of a system for managing bands of reserved tracks in accordance with various embodiments. In the embodiment shown in FIG. 11, a controller 1120 is coupled to a slider 1102 and a memory 1130. The slider 1102 includes a writer 1104 and a reader 1106 shown positioned relative to a number of standard data tracks 1110. A baseline reader-writer offset, $RWO_B$, is defined therebetween the writer 1104 and reader 1106 of the slider 1102. FIG. 11 also shows the same slider 1102A having a shifted $RWO_S$ (relative to $RWO_B$) positioned relative to a reserved band 1114 (e.g., band $B_3$) of tracks 1112 (e.g., 50 or 100 tracks). The reserved band 1114 (or a multiplicity of reserved bands 1114) can be located anywhere on the recoding medium. During the open period of reserved band 1114, data is written to each of the tracks 1112 with substantially the same reader-writer offset ($RWO_S$) until the reserved band 1114 is closed, thereby eliminating or significantly reducing encroachment on neighboring tracks 1112 of the band 1114.

The memory 1130 is configured to store various information (e.g., metadata) concerning one or more bands of reserved tracks on a surface of a magnetic recording medium. In the embodiment shown in FIG. 11, the memory 1130 is configured to store the identification (band ID) of a multiplicity of reserve bands ($B_1$-$B_n$), a reader offset for each band ($RO_1$-$RO_n$), and the status (e.g., closed or open) of each band. The memory 1130 is preferably non-volatile memory. In addition to the identification of each band, the band ID can include information concerning the identity of the magnetic recording medium (e.g., a particular disk in a multi-disk drive) and the surface of the medium (e.g., upper or lower surface). The reader offset, $RO_1$-$RO_n$, refers to the offset to be used by the controller 1120 (e.g., servo controller) to compensate for the RWO of a particular reserved band during read operations performed within the particular reserved band. The position of a head is described by track number and then servo offset from that track number. For example, tracks can be separated by 255 servo counts. Accordingly, the reader offset can be counted in servo track offset units. These servo track offset units typically scale with the track density. For example, the servo track offset will be smaller for 50 nm tracks than for 100 nm tracks.

Figure 12:
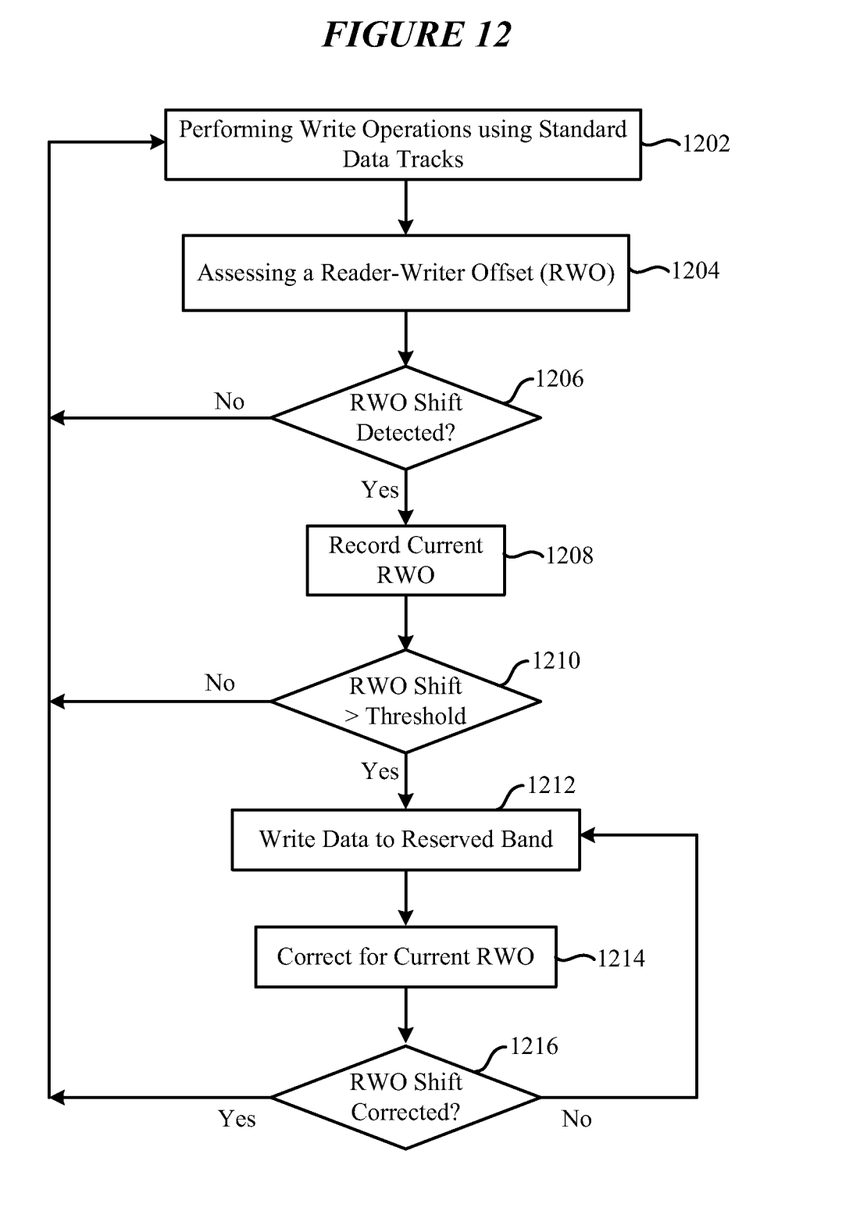
FIG. 12 illustrates various processes involving RWO correction in accordance with various embodiments.

FIG. 12 illustrates various processes involving RWO correction in accordance with various embodiments. The methodology shown in FIG. 12 involves performing 1202 write operations using standard data tracks, and assessing 1204 the RWO for the slider. It is noted that the write architecture used for writing to standard data tracks of a magnetic recording medium can be the same or a different architecture as that used for a band of reserved tracks. In various embodiments, the write architecture for writing to standard tracks and reserved tracks differs. If a shift in the RWO is detected 1206, the current RWO is recorded 1208, such as in the memory 1130 shown in FIG. 11. A check 1210 is made to determine if the RWO shift exceeds a threshold. If an RWO shift has been detected 1206 and does not exceed the threshold 1210, normal write operations continue 1212 using standard data tracks.

In the embodiment shown in FIG. 12, the current RWO is subject to correction only after a threshold has been exceeded. Until such threshold has been exceeded, writing to standard data tracks continues notwithstanding the presence of a shift in the RWO. The reason for delaying correction of the RWO is that the correction operations takes time which may not be warranted are available prior to exceeding the threshold. Measuring the RWO, on the other hand, takes relatively little time and can occur without appreciably impacting write and read performance. It is been determined that a shift in the RWO below the threshold can be tolerated and accounted for without appreciably impacting read operations of the system. If the RWO threshold is exceeded 1210, data is written 1212 to a reserved band of tracks in a manner previously described.

During the time in which data is written to the reserved band, processes can be implemented to correct 1214 for the current RWO, it being understood that RWO correction processing can occur at other times. For example, an RWO correction procedure can be performed which includes writing data to a track of the reserved band, measuring the RWO for the just-written track, and determining a readability metric (e.g., BER) for the just-written track. Based on the readability metric, a reader offset can be determined that attempts to correct for the RWO. The RWO correction procedure can be repeated to determine whether or not the RWO is relatively stable or constant. Adjustments to the reader offset can continue until acceptable readability metrics are obtained. If it is determined that the RWO is sufficiently stable or constant, the RWO shift can be considered corrected 1216, and normal operations can continue using standard data tracks at step 1202.

Figure 13:
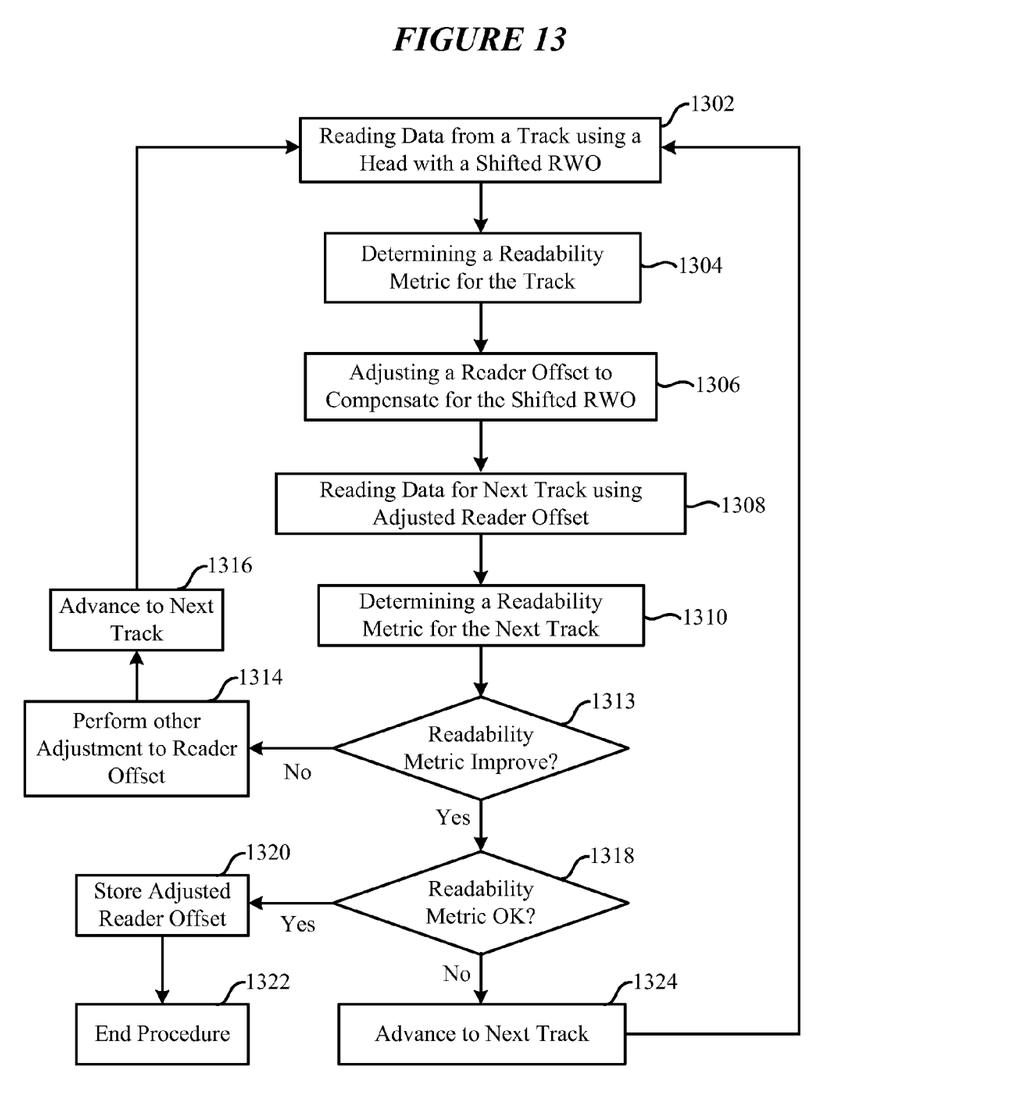
FIG. 13 is a flow chart showing a methodology for compensating for a shift in RWO in accordance with various embodiments.

FIG. 13 is a flow chart showing a methodology for compensating for a shift in RWO in accordance with various embodiments. The methodology shown in FIG. 13 is implemented within a reserved band of tracks for purposes of determining the RWO and compensating for same. According to FIG. 13, data is read 1302 from a track within a reserved band using a head with a shifted RWO, and a readability metric for the track is determined 1304. The methodology involves adjusting 1306 a reader offset to compensate for the shifted RWO, and reading data 1308 for the next track of the band using the adjusted reader offset. It is noted that the reader offset adjustment in step 1306 has the possibility of improving or worsening readability of the tracks of the reserved band at this point in the compensation procedure.

A readability metric for this next track is determined 1310. A comparison is made between the readability metric obtained in step 1310 and that obtained in step 1304 to determine 1313 if the readability metric of step 1310 has improved. If the readability metric has not improved, further adjustment 1314 to the reader offset is made, such as by adjusting the reader offset in a direction opposite from that made in step 1306. The procedure advances 1316 to the next track of the reserved band, and the processes beginning at step 1302 are repeated. If the readability metric has improved 1313, a check 1318 is made to determine if the readability metric is acceptable. If acceptable, the reader offset (adjusted) is stored for the reserved band, such as in the memory 1130 shown in FIG. 11, and the procedure is terminated 1322. If the readability metric at check 1318 is not acceptable, further refinement of the reader offset can continue by repeating the processes beginning at step 1302.

As was discussed previously, data can be written to a band of reserved tracks according to a shingled magnetic recording methodology or an interlaced magnetic recording methodology. Various shingled magnetic recording methodologies are known. According to some embodiments, an interlaced magnetic recording (IMR) technique provides for a higher total areal density capability with a lower observable bit error rate than conventional recording systems. For a reserved band that is subject to IMR, alternating data tracks have different track widths and different linear densities.

IMR can be implemented using a first write element used to write a first grouping of alternating data tracks with a wide written track width, and a second write element used to write a second grouping of interlaced data tracks with a narrower written track width. Data of the narrow, interlaced data tracks overwrites edges of adjacent and previously written data tracks of the wider width. In other words, a defined track pitch (e.g., radial spacing between centers of two directly adjacent data tracks) is by design less than the write width of the first write element but greater than or approximately equal to the write width of the second write element. In another IMR implementation, a first grouping of data tracks includes data of a higher linear density than the interlaced tracks. Other IMR implementations may provide for data tracks of three or more different written track widths and/or three or more different linear densities on a same surface of the magnetic storage medium.

Embodiments that use IMR when writing data to a band of reserved tracks can be implemented according to the embodiments disclosed in commonly-owned, co-pending U.S. patent application Ser. No. 14/686,456, filed on Apr. 14, 2015, which claims benefit of priority to U.S. Provisional Application No. 62/083,696, filed on Nov. 24, 2014, and also to commonly-owned, co-pending U.S. patent application Ser. No. 14/686,561, filed on Apr. 14, 2015, which claims benefit of priority to U.S. Provisional Patent Application No. 62/083,732, filed on Nov. 24, 2014, all of which are hereby incorporated herein by reference.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a heat-assisted magnetic recording head configured to write data to and read data from a magnetic recording medium, the head comprising a reader and a writer including a near-field transducer (NFT), the reader comprising a center which is laterally offset relative to a center of the writer to define a reader-writer offset (RWO) therebetween; and
   a controller configured to:
   control the writer to write data to data tracks of the medium;
   detect a shift in the RWO, the shift due to relative displacement between the writer center and the reader center in the recording head; and
   in response to the detected shift in the RWO, control the writer to write data to a plurality of tracks defining a reserved band during an open period of the reserved band.

2. The apparatus of claim 1, wherein the controller is configured to control the writer to write data to the plurality of tracks of the reserved band using a shingled recording methodology.

3. The apparatus of claim 1, wherein the controller is configured to control the writer to write data to the plurality of tracks of the reserved band using an interlaced recording methodology.

4. The apparatus of claim 1, wherein the open period defines a period of time during which the RWO shift remains substantially constant or remains within a predetermined range.

5. The apparatus of claim 1, wherein a duration of the open period is dependent on write time and write temperature of the writer.

6. The apparatus of claim 1, wherein the controller is configured to close the reserved band to further writing of data in response to expiration of the open period.

7. The apparatus of claim 1, wherein the controller is configured to measure the RWO shift and compensate for the RWO shift when reading tracks of the reserved band.

8. The apparatus of claim 1, wherein the controller is configured to:
   measure the RWO shift for at least one track of the reserved band; and
   apply a correction to compensate for the RWO shift when other tracks of the reserved band are read.

9. The apparatus of claim 1, wherein:
   the medium comprises a plurality of the reserved bands; and
   each of the reserved bands has an open period defining a period of time during which the RWO shift remains substantially constant.

10. The apparatus of claim 9, wherein:
    the controller is coupled to memory; and
    the memory is configured to store reader offset data to compensate for the RWO shift for each of the reserved bands.

11. An apparatus, comprising:
    a heat-assisted magnetic recording head configured to write data to and read data from a magnetic recording medium, the head comprising a reader and a writer including a near-field transducer (NFT), the reader comprising a center which is laterally offset relative to a center of the writer to define a reader-writer offset (RWO) therebetween; and
    a controller configured to:
    control the writer to write data to data tracks of the medium;
    detect a first shift in the RWO, the first shift due to relative displacement between the writer center and the reader center in the recording head;
    in response to the first RWO shift, control the writer to write data to a plurality of tracks defining a first reserved band during a first open period of the first reserved band;
    detect a second shift in the RWO;

in response to the second RWO shift and expiration of the first open period, control the writer to write data to a plurality of tracks defining a second reserved band during a second open period of the second reserved band.

12. The apparatus of claim 11, wherein the controller is configured to:
compensate for the first shift in the RWO; and
control the writer to write data to data tracks of the medium between compensating for the first RWO shift and detection of the second RWO shift.

13. A method, comprising:
moving a heat-assisted magnetic recording head relative to a magnetic recording medium comprising a plurality of tracks, the head comprising a reader and a writer including a near-field transducer (NFT), the reader comprising a center which is laterally offset relative to a center of the writer to define a reader-writer offset (RWO) therebetween;
writing data to data tracks of the medium;
detecting a shift in the RWO, the shift due to relative displacement between the writer center and the reader center in the recording head; and
writing data to a plurality of tracks defining a reserved band during an open period in response to detecting the RWO shift, such that the data written to tracks of the reserved band during the open period have substantially the same RWO.

14. The method of claim 13, wherein the open period defines a period of time during which the RWO remains substantially constant.

15. The method of claim 13, wherein the open period defines a period of time during which the RWO shift remains within a predetermined range.

16. The method of claim 13, further comprising closing the band to further writing of data in response to expiration of the open period.

17. The method of claim 13, wherein the open period is dependent on write time and write temperature of the writer.

18. The method of claim 13, wherein the medium comprises a plurality of reserved bands each having an open period during which data can be written in response to detecting the RWO shift.

19. The method of claim 13, further comprising:
storing RWO shift data; and
compensating for the RWO shift during subsequent reading operations using the stored RWO shift data.

20. The method of claim 13, further comprising:
reading a first track of the reserved band using the head having a shifted RWO;
determining a readability metric for the first track;
adjusting a reader offset to compensate for the shifted RWO;
reading a second track of the reserved band using the head having the reader offset;
determining a readability metric for the second track; and
determining if further adjustment to the reader offset is needed using the readability metrics of the first and second tracks.

21. The method of claim 13, wherein writing data to the reserved band comprises writing data to the plurality of tracks of the reserved band using a shingled recording methodology.

22. The method of claim 13, wherein writing data to the reserved band comprises writing data to the plurality of tracks of the reserved band using an interlaced recording methodology.

* * * * *